(12) United States Patent
Yanagi

(10) Patent No.: US 6,519,320 B2
(45) Date of Patent: Feb. 11, 2003

(54) STATE MONITORING METHOD AND APPARATUS IN SUBSCRIBER LINE TEST

(75) Inventor: Kazuya Yanagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/940,804

(22) Filed: Aug. 29, 2001

(65) Prior Publication Data

US 2002/0025025 A1 Feb. 28, 2002

(30) Foreign Application Priority Data

Aug. 30, 2000 (JP) ........................ 2000-260822

(51) Int. Cl.⁷ .......................... H04M 1/24; H04M 3/08; H04M 3/22
(52) U.S. Cl. ................. 379/22.04; 379/1.01; 379/2; 379/9; 379/29.01; 379/32.01
(58) Field of Search ............... 379/1.01, 1.03, 379/1.04, 2, 9, 9.06, 15.01, 16, 22.04, 27.01, 28, 29.01, 32.01, 32.02, 32.04

(56) References Cited

U.S. PATENT DOCUMENTS

| | | | | |
|---|---|---|---|---|
| 5,905,781 A | * | 5/1999 | McHale et al. | 379/93.14 |
| 6,181,775 B1 | * | 1/2002 | Bella | 379/29 |
| 6,349,130 B1 | * | 2/2002 | Posthuma et al. | 379/1.04 |
| 6,212,258 B1 | * | 4/2002 | Bella et al. | 379/29 |
| 6,366,644 B1 | * | 4/2002 | Sisk et al. | 379/1.04 |
| 6,404,347 B1 | * | 6/2002 | Kiko | 340/653 |
| 6,278,769 B1 | * | 8/2002 | Bella | 379/29.11 |
| 6,292,468 B1 | * | 9/2002 | Sanderson | 370/241 |
| 6,449,362 B1 | * | 9/2002 | Tennyson et al. | 379/413.02 |
| 6,453,016 B1 | * | 9/2002 | Chea, Jr. | 379/29.01 |

FOREIGN PATENT DOCUMENTS

WO    WO 01/65816 A3 * 9/2002 ............ H04M/3/30

* cited by examiner

Primary Examiner—Binh Tieu
(74) Attorney, Agent, or Firm—Foley & Lardner

(57) ABSTRACT

In a state monitoring method in a subscriber line test in a communication system in which a subscriber telephone and a subscriber terminal are independently connected to a telephone exchange and an ADSL (Asymmetric Digital Subscriber Line) apparatus through a subscriber line, the telephone exchange to which a first control terminal is connected is connected, through an interface, to the ADSL apparatus to which a second control terminal is connected. A line blocked state due to a line test instruction is notified from one of the first and second control terminals to the other of the first and second control terminals through the interface. Upon receiving the notification of the line block state due to the line test instruction, the other of the first and second control terminals determines that the line blocked state is not caused by a fault. A state monitoring apparatus is also disclosed.

8 Claims, 4 Drawing Sheets

STATE MONITORING METHOD AND APPARATUS IN SUBSCRIBER LINE TEST

BACKGROUND OF THE INVENTION

The present invention relates to a state monitoring method and apparatus in a subscriber line test between a telephone exchange and an ADSL (Asymmetric Digital Subscriber Line) apparatus.

Two kinds of control on the POTS (Plain Ordinary Telephone Service) subscriber line and ADSL subscriber line are required for a subscriber who is receiving a POTS, which is an existing telephone service through a telephone exchange, and an ADSL service, which is asymmetric digital subscriber line communication. Since POTS control in a telephone exchange and ADSL control in an ADSL apparatus are mutually independent, it is impossible for the telephone exchange to know the state of the ADSL apparatus, and vice versa. For this reason, a line blocked state due to a line test instruction from one control terminal looks like a fault to the other control terminal.

FIG. 4 shows a conventional communication system. The conventional communication system shown in FIG. 4 is comprised of a subscriber 3 constituted by a telephone 31 and terminal 32, a multiplexing/matching circuit 8 to which the telephone 31 and terminal 32 are connected and which executes line matching and modulates/multiplexes a voice signal from the telephone 31 and a data signal from the terminal 32 in different frequency bands, a demultiplexing circuit 9 for demultiplexing the multiplexed voice signal and data signal, a telephone exchange 1 for receiving the voice signal from the demultiplexing circuit 9, an ADSL control section 21 for receiving the data signal from the demultiplexing circuit 9, a control terminal 4 which is connected to the telephone exchange 1 to maintain and manage the telephone exchange 1, a data network 7 to which an ADSL apparatus 2 is connected, a control terminal 5 which is connected to the data network 7 to maintain and manage various units subordinate to the data network 7, and a PSTN 6 to which the telephone exchange 1 is connected.

The telephone exchange 1 includes a POTS control section 11 which is a subscriber circuit of the telephone exchange 1 and sends a telephone voice signal to a PSTN (Public Switched Telephone Network) upon converting it into a digital signal, and a host apparatus 12 for controlling transmission/reception of the voice data as the digital signal. The ADSL apparatus 2 includes the ADSL control section 21, which is a subscriber circuit of the ADSL apparatus 2, and a host apparatus 22 for controlling transmission/reception of data signals to/from the terminal 32.

In the conventional communication system having the above arrangement, the control terminal 5 on the ADSL apparatus 2 side knows nothing about a line test instruction from the control terminal 4 on the telephone exchange 1 side. For this reason, the control terminal 5 determines even a line blocked state for a line test as a line blocked state of the subscriber 3, i.e., a fault.

SUMMARY OF THE INVENTION

It is an object of the present invention to provide a state monitoring method and apparatus in a subscriber line test, which can notify one control terminal of a line blocked state due to a line test instruction from the other control terminal when a control terminal on the POTS side in a telephone exchange and a control terminal on the ADSL side in an ADSL apparatus exist independently of each other.

In order to achieve the above object, according to the present invention, there is provided a state monitoring method in a subscriber line test in a communication system in which a subscriber telephone and a subscriber terminal are independently connected to a telephone exchange and an ADSL (Asymmetric Digital Subscriber Line) apparatus through a subscriber line, comprising the steps of connecting, through an interface, the telephone exchange to which a first control terminal is connected to the ADSL apparatus to which a second control terminal is connected, notifying a line blocked state due to a line test instruction from one of the first and second control terminals to the other of the first and second control terminals through the interface, and causing the other of the first and second control terminals to determine, when receiving a notification of the line block state due to the line test instruction, that the line blocked state is not caused by a fault.

DESCRIPTION OF THE PREFERRED EMBODIMENT

The present invention will be described in detail below with reference to the accompanying drawings.

Figure 1:
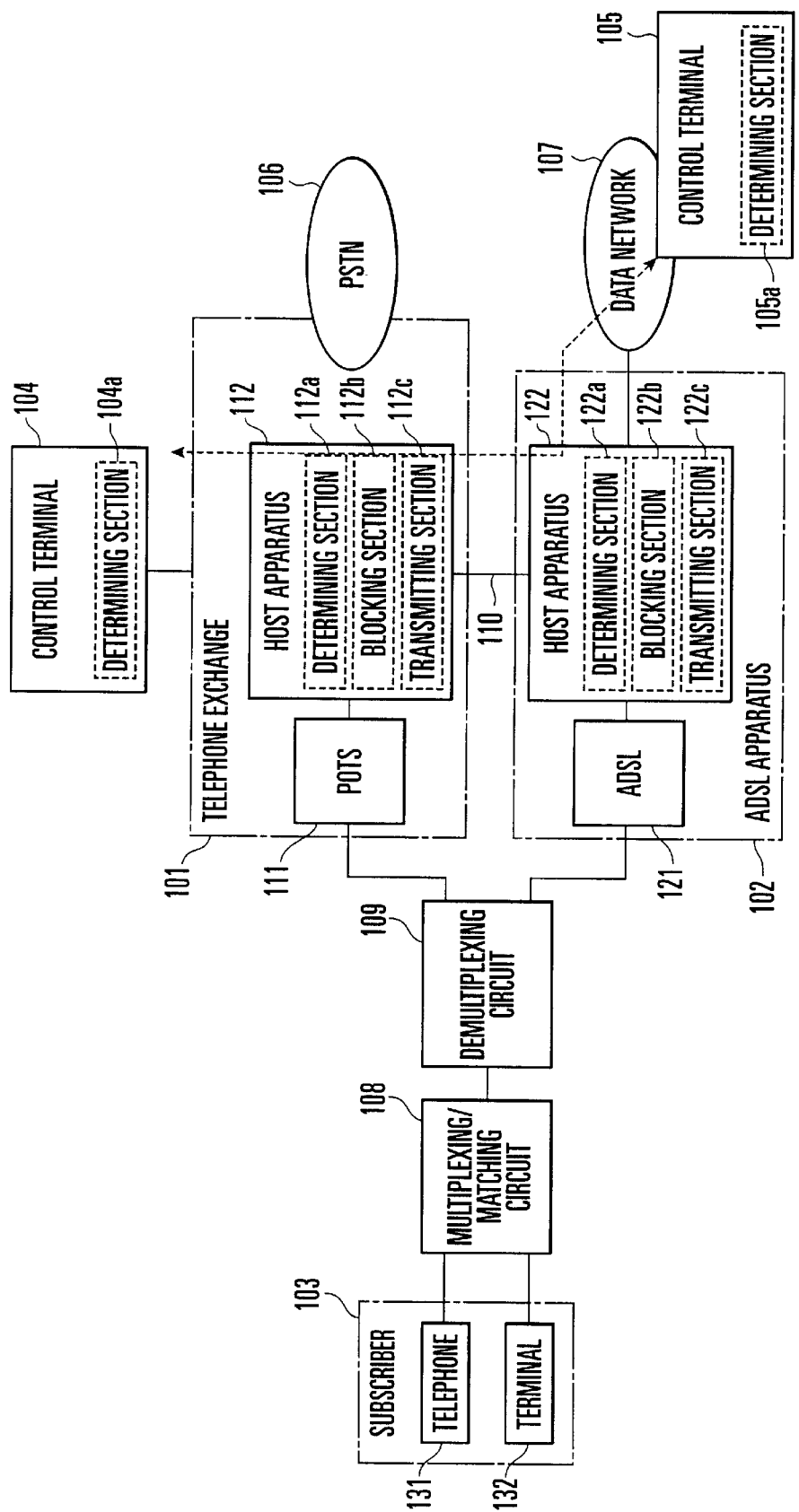
FIG. 1 is a block diagram showing a communication system according to an embodiment of the present invention.

FIG. 1 shows a communication system according to an embodiment of the present invention. The communication system shown in FIG. 1 is comprised of a subscriber 103 constituted by a telephone 131 and terminal 132, a multiplexing/matching circuit 108 to which the telephone 131 and terminal 132 are connected and which executes line matching and modulates/multiplexes a voice signal from the telephone 131 and a data signal from the terminal 132 in different frequency bands, a demultiplexing circuit 109 for demultiplexing the multiplexed voice signal and data signal, a telephone exchange 101 for receiving the voice signal from the demultiplexing circuit 109, an ADSL apparatus 102 for receiving the data signal from the demultiplexing circuit 109, a control terminal 104 which is connected to the telephone exchange 101 to maintain and manage the telephone exchange 101, a data network 107 to which the ADSL apparatus 102 is connected, a control terminal 105 which is connected to the data network 107 to maintain and manage various units subordinate to the data network 107, and a PSTN 106 to which the telephone exchange 101 is connected.

A host apparatus 112 of the telephone exchange 101 is connected to a host apparatus 122 of the ADSL apparatus 102 through an interface 110. The control terminals 104 and 105 respectively have determining sections 104a and 105a each for determining the blocked state of a subscriber line.

The telephone exchange 101 includes a POTS control section 111 which is a subscriber circuit of the telephone exchange 101 and sends a telephone voice signal to a PSTN (Public Switched Telephone Network) upon converting it into a digital signal, and a host apparatus 112 for controlling transmission/reception of the voice data as the digital signal. The host apparatus 112 includes a determining section 112a for determining a block instruction, a blocking section 112b for blocking the subscriber line, and a transmitting section 112c for transmitting line test information to the control terminal 104.

The ADSL apparatus 102 includes an ADSL control section 121 which is a subscriber circuit of the ADSL apparatus 102, and the host apparatus 122 for controlling transmission/reception of data signals to/from the terminal 132. The host apparatus 122 includes a determining section 122a for determining a block instruction, a blocking section 122b for blocking the subscriber line, and a transmitting section 122c for transmitting line test information to the control terminal 105.

In the above communication system, a voice signal from the telephone 131 of the subscriber 103 and a data signal from the terminal 132 are multiplexed by the multiplexing/matching circuit 108. The multiplexed signal is transmitted to the multiplexing/matching circuit 108 by using different frequency bands on the same wire. The voice signal demultiplexed by the demultiplexing circuit 109 is output to the POTS control section 111, and the data signal to the ADSL control section 121. The POTS control section 111 converts the voice signal from the telephone 131 of the subscriber 103 into a digital signal, and transmits it to the PSTN (Public Switched Telephone Network) 106 through the host apparatus 112. The ADSL control section 121 processes the data signal from the terminal 132 of the subscriber 103 and transmits the resultant signal to the data network 107 through the host apparatus 122. The host apparatuses 112 and 122 notify each other of the states of lines under the control of the respective apparatuses through the interface 110.

Figure 2:
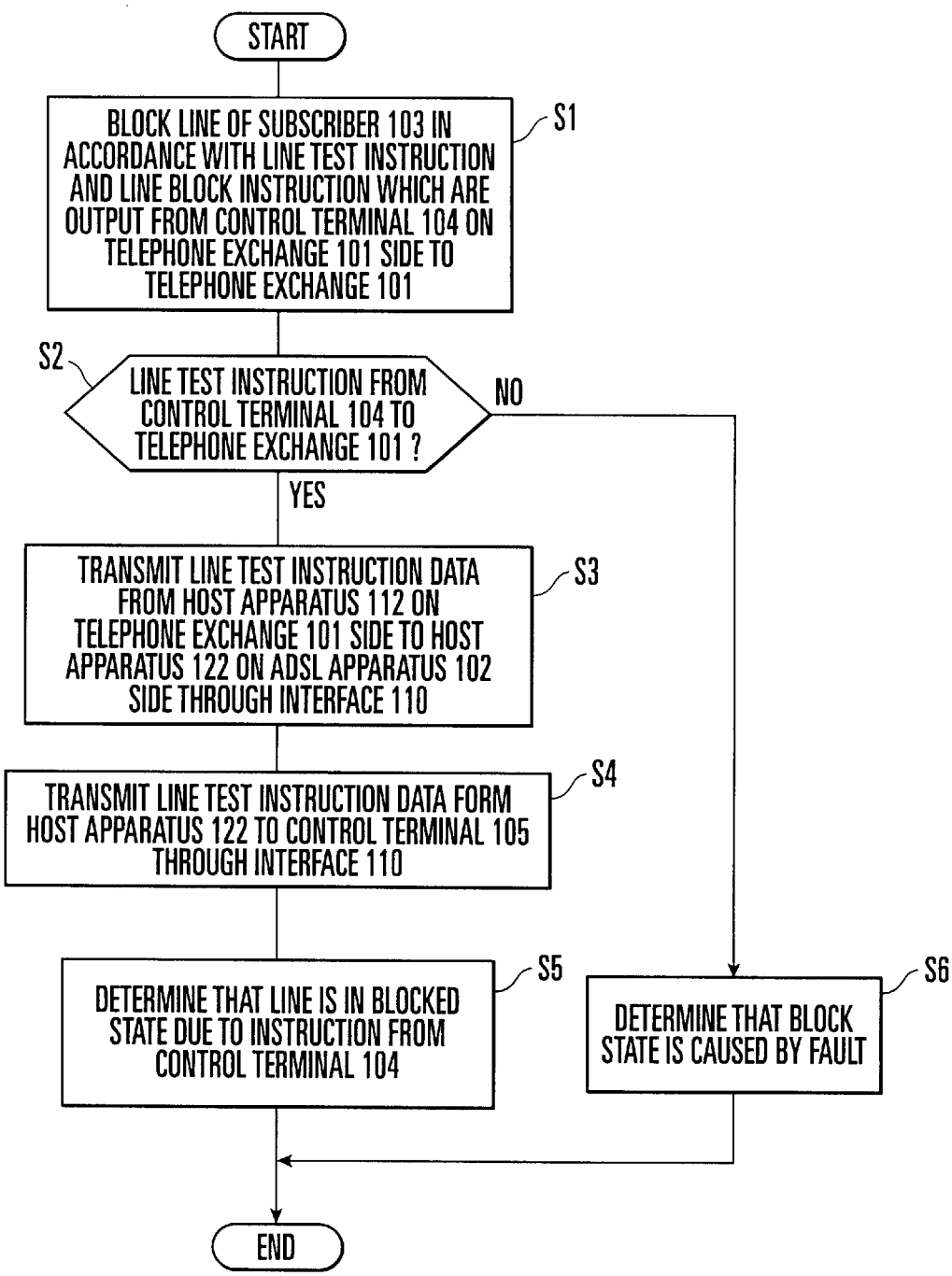
FIG. 2 is a flow chart showing operation to be performed when a line test is performed from the telephone exchange side in the communication system in FIG. 1.
Figure 3:
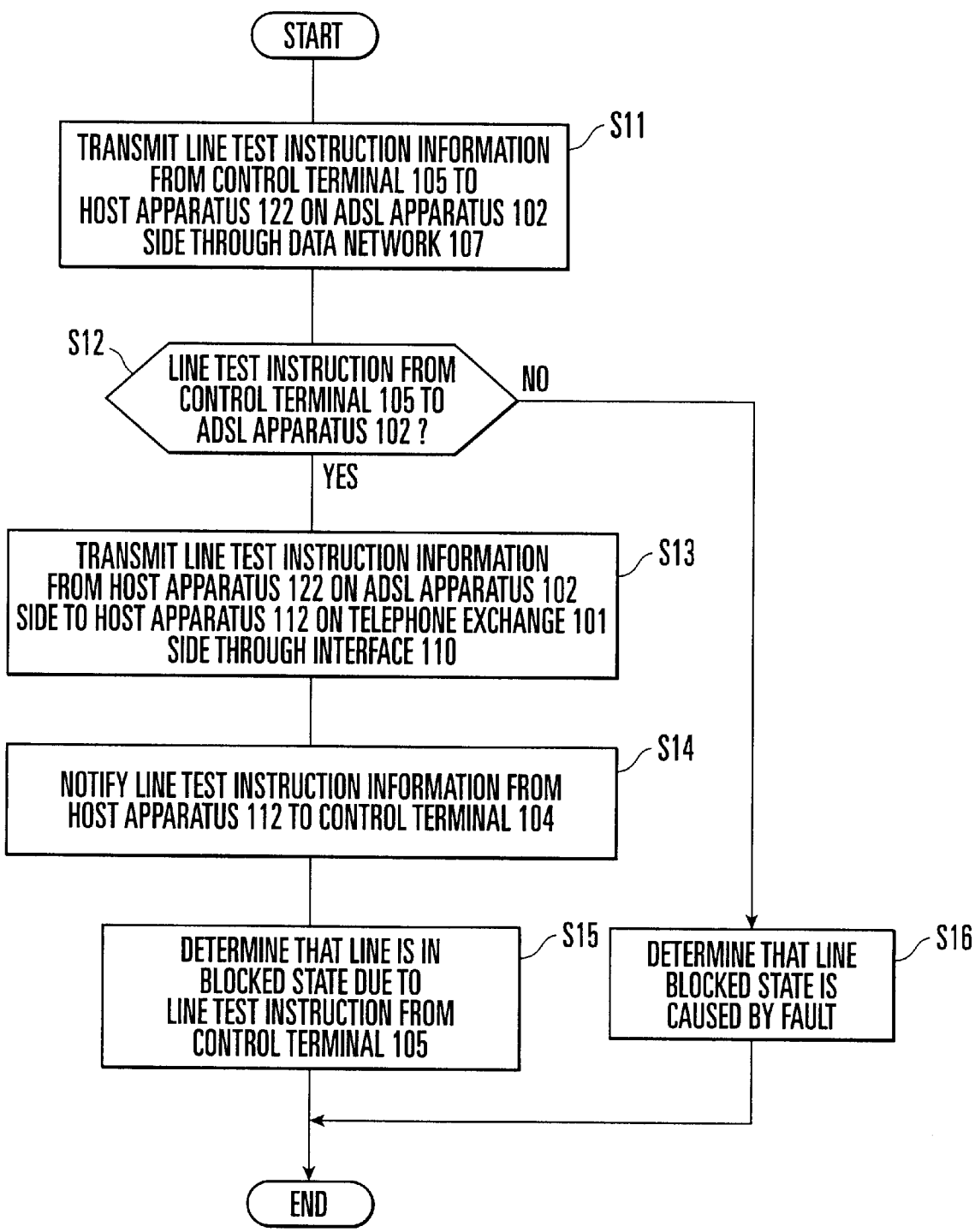
FIG. 3 is a flow chart showing operation to be performed when a line test is performed from the ADSL apparatus side in the communication system in FIG. 1.
Figure 4:
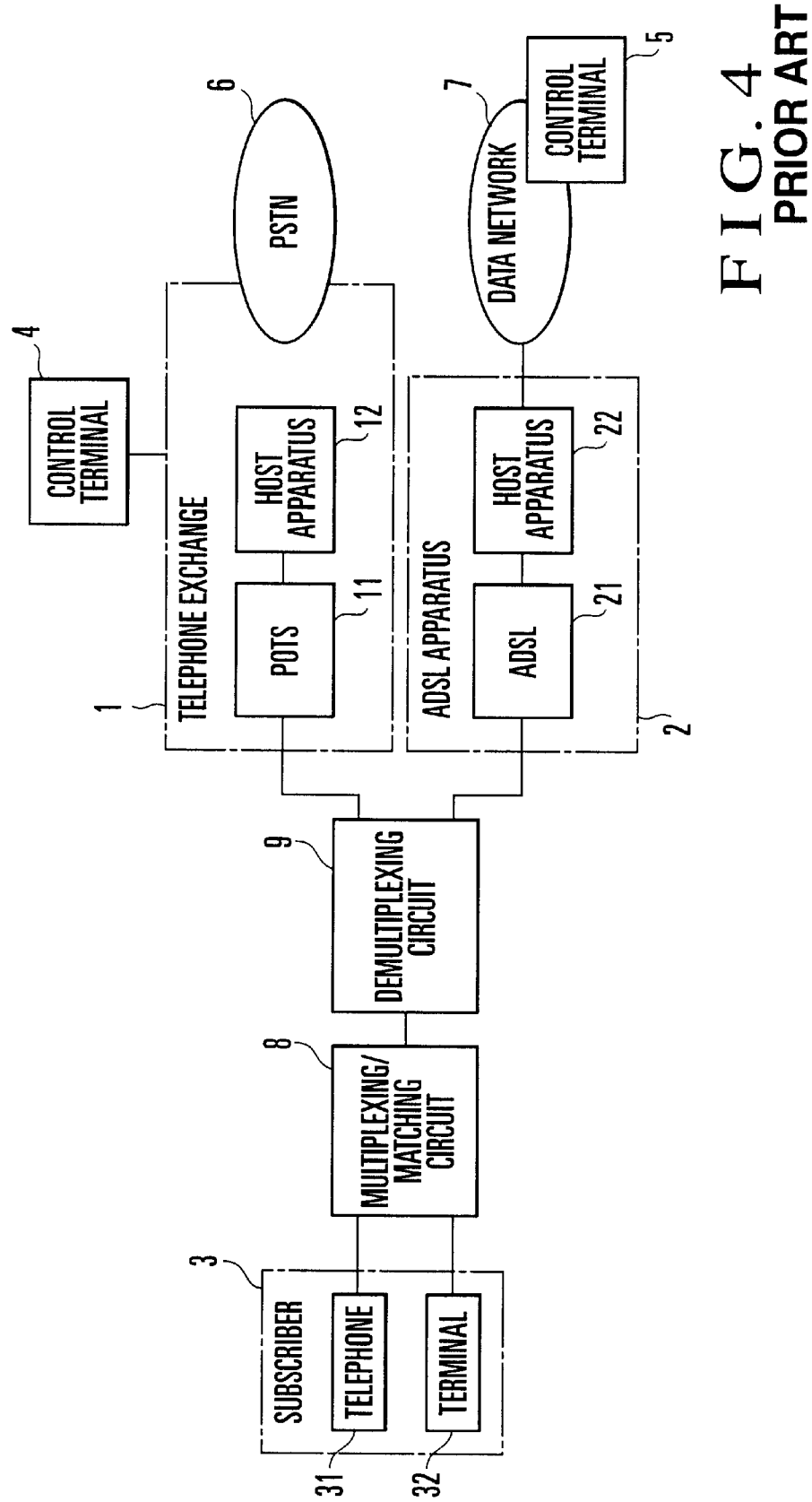
FIG. 4 is a block diagram showing a conventional communication system.

The operation of the communication system having the above arrangement will be described next with reference to FIGS. 2 and 3.

A case where a line test is performed from the control terminal 104 on the telephone exchange 101 side will be described with reference to FIG. 2. First of all, the control terminal 104 on the telephone exchange 101 side outputs a line test instruction and line block instruction to the telephone exchange 101, and the blocking section 112b blocks the line of the subscriber 103 (step S1). The determining section 112a then checks whether a line test instruction is output from the control terminal 104 (step S2).

If a line test instruction is output from the control terminal 104, the telephone exchange 101 drops line test instruction data from the host apparatus 112 of the telephone exchange 101 to the interface 110 to transmit the line test instruction data to the host apparatus 122 on the ADSL apparatus 102 side (step S3). The determining section 122a of the host apparatus 122 transmits the line test instruction data, received through the interface 110, to the control terminal 105 (step S4). With this operation, the control terminal 105 can be indirectly notified of the state of a line subordinate to the control terminal 104, although there is actually no direct interface between the control terminal 104 and the control terminal 105.

When the determining section 105a of the control terminal 105 receives the line test instruction data, the section 105a recognizes that the subscriber line is in a blocked state due to an instruction from the control terminal 104, thereby determining that the blocked state is not a fault (step S5). If no line test instruction is output from the control terminal 104, the determining section 105a determines that the subscriber line is in a blocked state due to a fault (step S6).

A case where a line test is performed from the control terminal 105 on the ADSL apparatus 102 side will be described next with reference to FIG. 3. First of all, the control terminal 105 transmits line test instruction information (including line block instruction information) to the ADSL apparatus 102 through the data network 107 (step S11). Upon reception of this information, the blocking section 122b blocks the subscriber line. The determining section 122a then checks whether line test instruction information is output from the control terminal 105 (step S12).

If line test instruction information is output from the control terminal 105, the host apparatus 122 of the ADSL apparatus 102 drops the line test instruction information to the interface 110 to transmit it to the host apparatus 112 of the telephone exchange 101 (step S13). Upon reception of this information, the transmitting section 112c of the host apparatus 112 notifies the control terminal 104 of the line test instruction information (step S14).

When the determining section 104a of the control terminal 104 receives the data of the line test instruction information, the section 104a recognizes that the subscriber line is in a blocked state due to the line test instruction from the control terminal 105, thereby determining that the blocked state is not caused by a fault (step S15). If no line test instruction is output from the control terminal 105, the determining section 104a determines that the subscriber line is in a blocked state due to fault (step S16).

Although the determining section 112a and blocking section 112b are installed in the host apparatus 112 of the telephone exchange 101, their installation positions are not limited as long as they are installed in the telephone exchange 101. Although the determining section 122a and blocking section 122b are installed in the host apparatus 122 of the ADSL apparatus 102, their installation positions are not limited as long as they are installed in the ADSL apparatus 102.

As has been described above, the present invention can prevent a line blocked state due to a line test instruction from the control terminal on one of the telephone exchange side or the adsl apparatus side from being mistaken for a blocked state due to a fault by the other control terminal.

What is claimed is:

1. A state monitoring method in a subscriber line test in a communication system in which a subscriber telephone and a subscriber terminal are independently connected to a telephone exchange and an ADSL (Asymmetric Digital Subscriber Line) apparatus through a subscriber line, comprising the steps of:

connecting, through an interface, the telephone exchange to which a first control terminal is connected to the ADSL apparatus to which a second control terminal is connected;

notifying a line blocked state due to a line test instruction from one of the first and second control terminals to the other of the first and second control terminals through the interface; and causing the other of the first and second control terminals to determine, when receiving a notification of the line block state due to the line test instruction, that the line blocked state is not caused by a fault.

2. A method according to claim 1, wherein
the step of notifying comprises the steps of:
sending out a line test instruction for performing a line test on a subscriber line and a line block instruction from the first control terminal to the telephone exchange, and blocking the subscriber line;

when the subscriber is blocked, determining whether a line test instruction is output from the first control terminal; and when a line test instruction is output, transmitting line test instruction data from a host apparatus of the telephone exchange to an host apparatus of the ADSL apparatus through the interface, and the step of determining comprises the steps of:

transmitting the line test instruction data received through the interface from the host apparatus of the ADSL apparatus to the second control terminal; and when the second control terminal receives line test instruction data, determining that the line blocked state is not caused by a fault.

3. A method according to claim 1, wherein the step of notifying comprises the steps of:

sending out a line test instruction for performing a line test on a subscriber line and a line block instruction from the second control terminal to the ADSL apparatus, and blocking the subscriber line;

when the subscriber is blocked, determining whether a line test instruction is output from the second control terminal; and when a line test instruction is output, transmitting line test instruction data from a host apparatus of the ADSL apparatus to an host apparatus of the telephone exchange through the interface, and the step of determining comprises the steps of:

transmitting the line test instruction data received through the interface from the host apparatus of the telephone exchange to the first control terminal; and when the first control terminal receives line test instruction data, determining that the line blocked state is not caused by a fault.

4. A state monitoring apparatus in a subscriber line test, comprising:

a telephone exchange and an ADSL (Asymmetric Digital Subscriber Line) apparatus to which a subscriber telephone and a subscriber terminal are independently connected through a common subscriber line;

a first control terminal connected to said telephone exchange;

a second control terminal connected to said ADSL apparatus through a data network; and an interface for notifying a line blocked state due to a line test instruction from one of said first and second control terminals to the other of said first and second control terminals.

5. An apparatus according to claim 4, wherein said telephone exchange comprises:

line blocking means for blocking the subscriber line on the basis of a line test instruction for a line test on the subscriber line and a line block instruction which are sent out from said first control terminal; and determining means for determining whether a line test instruction is output from said first control terminal, said ADSL apparatus comprises transmitting means for, when a line test instruction is output, receiving line test instruction data from said telephone exchange through said interface, and transmitting the data to said second control terminal, and said second control terminal comprises determining means for, when line test instruction data is received from said ADSL apparatus, determining that the line blocked state is not caused by a fault.

6. An apparatus according to claim 5, wherein said ADSL apparatus comprises a host apparatus including said transmitting means.

7. An apparatus according to claim 4, wherein said ADSL apparatus comprises:

line blocking means for blocking the subscriber line on the basis of a line test instruction for a line test on the subscriber line and a line block instruction which are sent out from said second control means; and determining means for determining whether a line test instruction is output from said second control means, said telephone exchange comprises transmitting means for, when a line test instruction is output, receiving line test instruction data from said ADSL apparatus through said interface, and transmitting the data to said first control terminal, and said first control terminal comprises determining means for, when line test instruction data is received from said telephone exchange, determining that the line blocked state is not caused by a fault.

8. An apparatus according to claim 7, wherein said telephone exchange comprises a host apparatus including said transmitting means.

* * * * *